No. 791,390.                                                    Patented May 30, 1905.

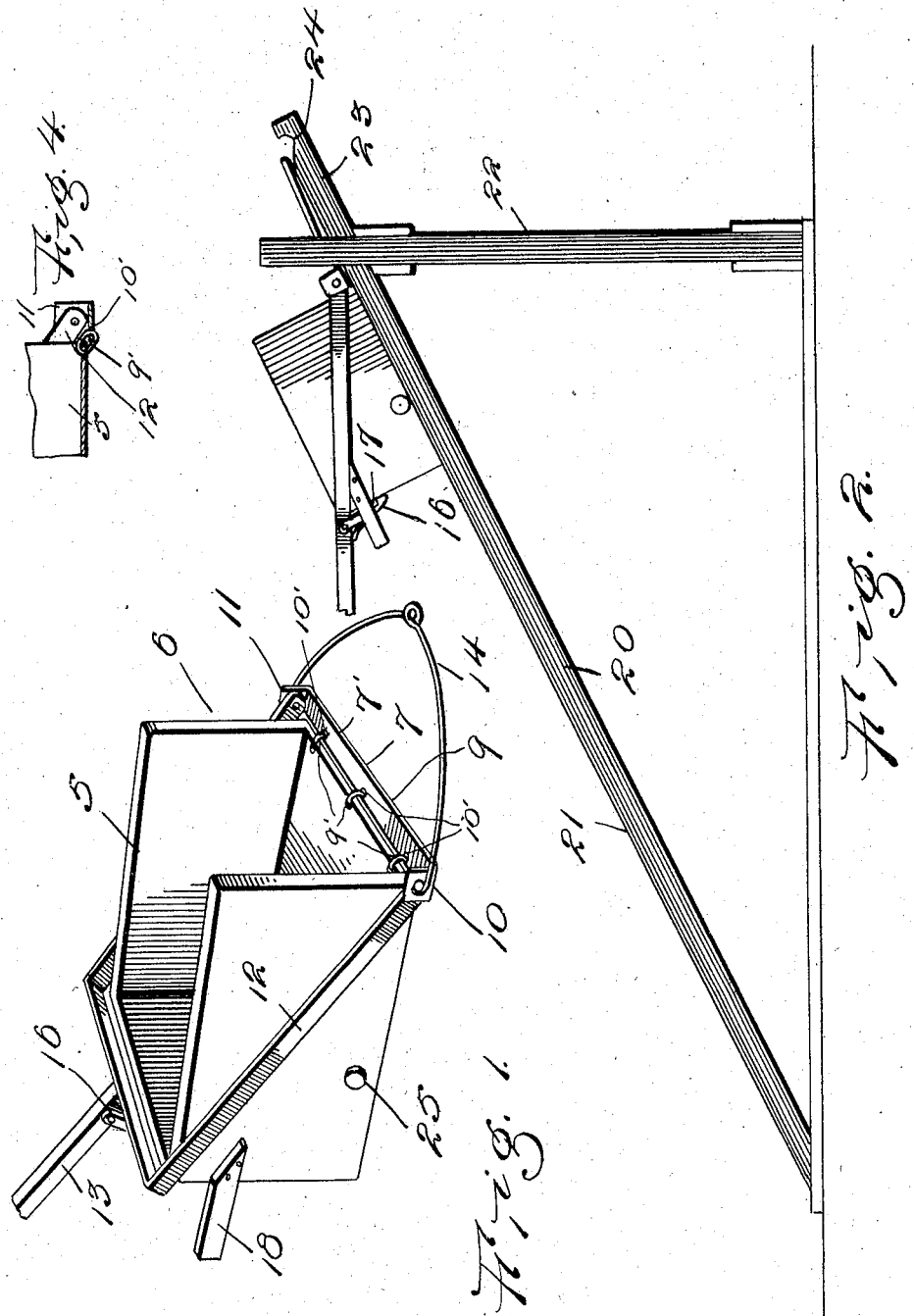

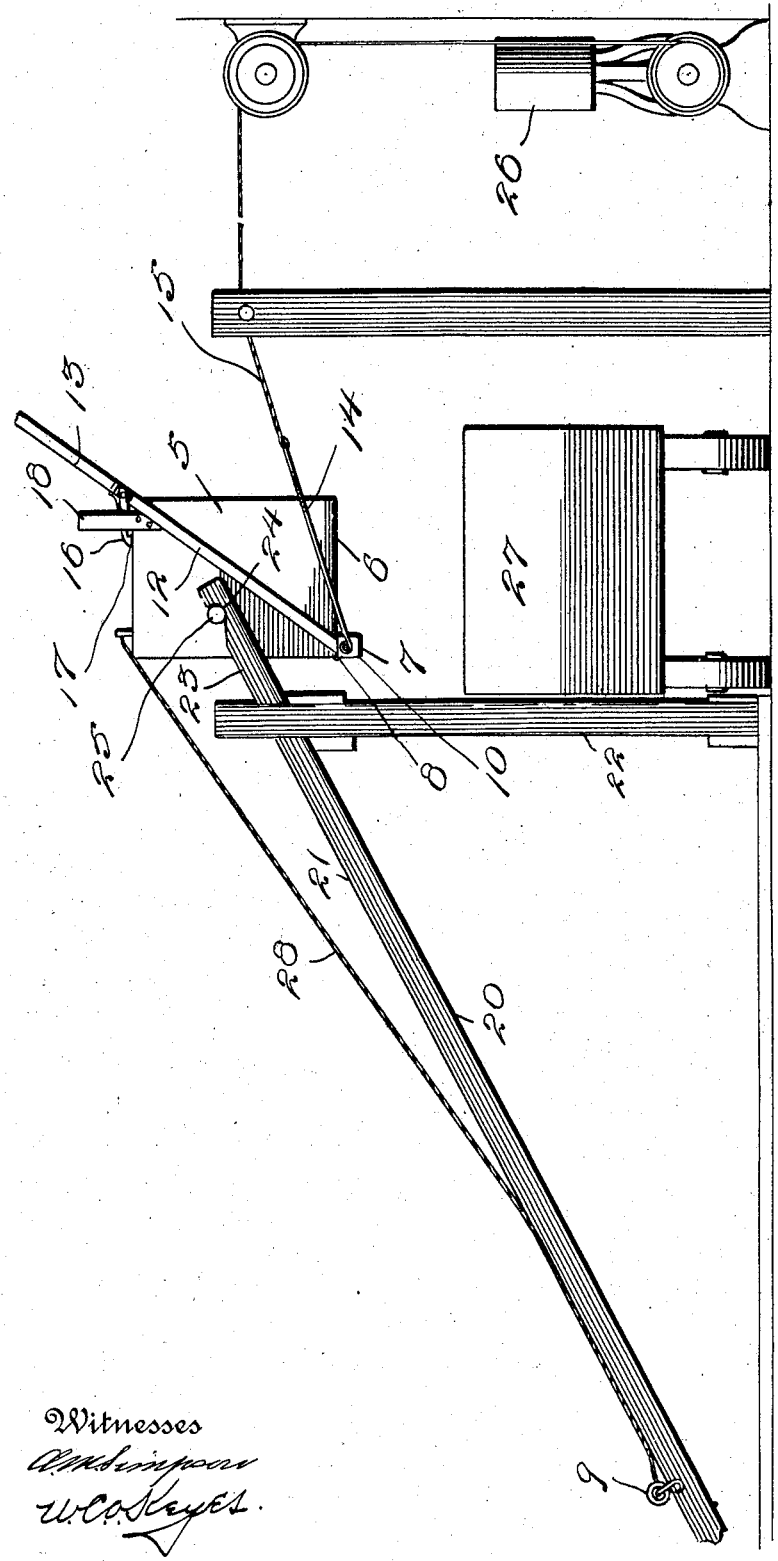

UNITED STATES PATENT OFFICE.

NICHOLAS WIESEN, OF REDOAK, IOWA.

EXCAVATING-SCOOP.

SPECIFICATION forming part of Letters Patent No. 791,390, dated May 30, 1905.

Application filed June 10, 1904. Serial No. 212,006.

*To all whom it may concern:*

Be it known that I, NICHOLAS WIESEN, a citizen of the United States, residing at Redoak, in the county of Montgomery, State of Iowa, have invented certain new and useful Improvements in Excavating-Scoops; and I do hereby declare the following to be a full, clear, and exact description of the invention, such as will enable others skilled in the art to which it appertains to make and use the same.

This invention relates to excavating-scoops, and has for its object to provide a scoop for use in connection with a loading-chute in which the scoop may be used for excavating as well as for conveying the loose earth to vehicles.

A further object is to provide a scoop having an excavating-blade, which may be moved into operative or inoperative position, as desired.

In the drawings forming a portion of this specification, and in which like numerals of reference indicate similar parts in the several views, Figure 1 is a perspective view of the scoop. Fig. 2 is a side elevation of the loading-chute, showing the scoop thereon. Fig. 3 is a side elevation of the scoop in the act of dumping its load. Fig. 4 is a longitudinal section taken vertically through a portion of the scoop and excavating-blade.

Referring now to the drawings, there is shown a scoop 5, opened at its forward end 6 and having an excavating-blade 7, hinged to the forward edge 8 of the bottom of the scoop through the medium of rings 9′ engaged through holes 10′ in the bottom of the scoop and rear edge portion of the excavating-blade. The forward edge 7′ of the blade is beveled upwardly to form a cutting edge 9, and the ends 10 and 11 of the blade are turned upwardly at right angles beyond the sides of the scoop and have secured thereto the free ends of a rearwardly-extending yoke 12, having a handle 13 attached thereto. Connected with the angular ends 10 and 11 of the blade, by means of a curved bar 14, is a cable 15, by means of which the scoop may be drawn out of the ground, and through the medium of the handle 13 and yoke 12 the cutting edge 9 of the blade 7 may be moved downwardly to engage the earth, the latter being cut thereby and passing into the scoop. The handle 13 may also be used to guide the scoop. When it is desired to move the blade 7 out of engagement with the earth, the handle 13 is moved downwardly to sufficiently elevate the forward edge of the blade and a latch 16 is engaged with a projection 17 to hold the handle in this position, it being understood that the latch is attached to the handle. In this position the side members of the yoke rest their rearward ends upon members 18 and 19, which are attached to the sides of the scoop, as shown.

The scoop just described is employed in connection with a loading-chute 20, including an inclined plane 21, supported by uprights 22, and which has projecting beyond its upper end, at the sides thereof, a pair of arms 23, having notches 24 in their upper edges. The cable 15, by means of which the scoop is drawn over the ground, is passed longitudinally over the inclined plane 21, so that after the excavating operation has been completed and the scoop is filled with earth it will be drawn onto the inclined plane, up which it will travel to the arms 23, which are so disposed that they receive upon their upper edges trunnions 25, which project from the sides of the scoop, it being understood that the cable 15 is connected with a hoisting-engine or other source of power 26. When the forward end of the scoop has passed sufficiently far beyond the upper end of the plane 21 to engage the trunnions 25 in the notches 24, the weight of the forward end of the scoop causes it to turn upon the trunnions and its load is deposited into a wagon or car 27, placed into position to receive it.

A rope 28 is attached to the rear of the scoop at one end, to which a horse may be attached to draw the scoop to the bottom of the chute after the operation of dumping.

In practice modifications of the specific construction shown may be made and any suitable materials and proportions may be used for the various parts without departing from the spirit of the invention.

What is claimed is—

1. In a loader, the combination with an inclined plane having arms extending beyond its upper end, said arms having notches in their upper edges, of an excavating-scoop having an open end and trunnions projecting from its sides arranged for movement longitudinally of the plane to bring its trunnions into engagement with the notches, said trunnions being arranged for movement in the notches to permit of downward movement of the open end of the scoop, a cutting-blade hinged to the scoop for movement to bring its cutting edge above and below the bottom thereof, and means for holding the blade in the first-named position.

2. An excavating-scoop comprising a receptacle open at its forward end, a cutting-blade pivoted at the forward end of the receptacle for movement to bring its cutting edge above and below the bottom thereof, a rearwardly-extending yoke secured to the blade, a handle attached to the yoke for movement thereof, to move the blade pivotally, a latch connected with the yoke and arranged for engagement with a projection upon the receptacle to hold the blade with its cutting edge above the bottom of the receptacle, and means for connecting a cable with the scoop.

In testimony whereof I affix my signature in presence of two witnesses.

NICHOLAS WIESEN.

Witnesses:
N. E. STUCKER,
A. C. MEAD.